United States Patent [19]

Morrone

[11] Patent Number: 5,357,826
[45] Date of Patent: * Oct. 25, 1994

[54] ADJUSTABLE HANDLEBAR FOR BICYCLE

[76] Inventor: James V. Morrone, 267 Shirley St., Winthrop, Mass. 02152

[*] Notice: The portion of the term of this patent subsequent to Jun. 16, 2009 has been disclaimed.

[21] Appl. No.: 79,391

[22] Filed: Jun. 21, 1993

Related U.S. Application Data

[63] Continuation of Ser. No. 404,867, Sep. 8, 1989, Pat. No. 5,121,652, and a continuation of Ser. No. 898,466, Jun. 15, 1992, Pat. No. 5,259,266.

[51] Int. Cl.[5] ............................................ B62K 21/16
[52] U.S. Cl. ..................................................... 74/551.3
[58] Field of Search ........................... 74/551.1–551.8; 280/279

[56] References Cited

U.S. PATENT DOCUMENTS

| | | | |
|---|---|---|---|
| 603,542 | 5/1898 | Sargeant | 74/551.1 |
| 608,021 | 7/1898 | Bille | 74/551.2 |
| 689,217 | 12/1901 | Palmer | 74/551.3 |
| 1,156,420 | 10/1915 | Maclean | 74/551.2 |
| 1,211,303 | 1/1917 | Eckel | 74/551.2 |
| 2,594,451 | 4/1952 | Konsel | 74/551.3 |
| 3,481,218 | 12/1969 | Yoshikawa | 74/551.3 |
| 4,023,436 | 5/1977 | Dodge | 74/551.3 |
| 4,420,989 | 12/1983 | Finkle | 74/551.2 |
| 4,653,745 | 3/1987 | Nakao et al. | 74/551.1 |
| 5,154,095 | 10/1992 | Giard | 74/551.8 |
| 5,163,339 | 11/1992 | Giard et al. | 74/551.1 |

FOREIGN PATENT DOCUMENTS

| | | | |
|---|---|---|---|
| 523314 | 10/1953 | Belgium | 74/551.3 |
| 1074141 | 10/1954 | France | 74/551.1 |
| 456542 | 4/1950 | Italy | 74/551.1 |
| 1134458 | 1/1985 | U.S.S.R. | 74/551.1 |
| 228411 | 2/1925 | United Kingdom | 74/551.3 |

*Primary Examiner*—Vinh T. Luong

[57] ABSTRACT

An adjustable handlebar apparatus for support on a bicycle frame. The handlebar apparatus includes a base member clamped to the bicycle frame, a rocker member disposed on the base frame and pivotally supported from the base member, and a handlebar assembly. The handlebar assembly includes a handlebar attached to a slide member. This slide member interlocks in different longitudinally disposed positions in the rocker member.

8 Claims, 16 Drawing Sheets

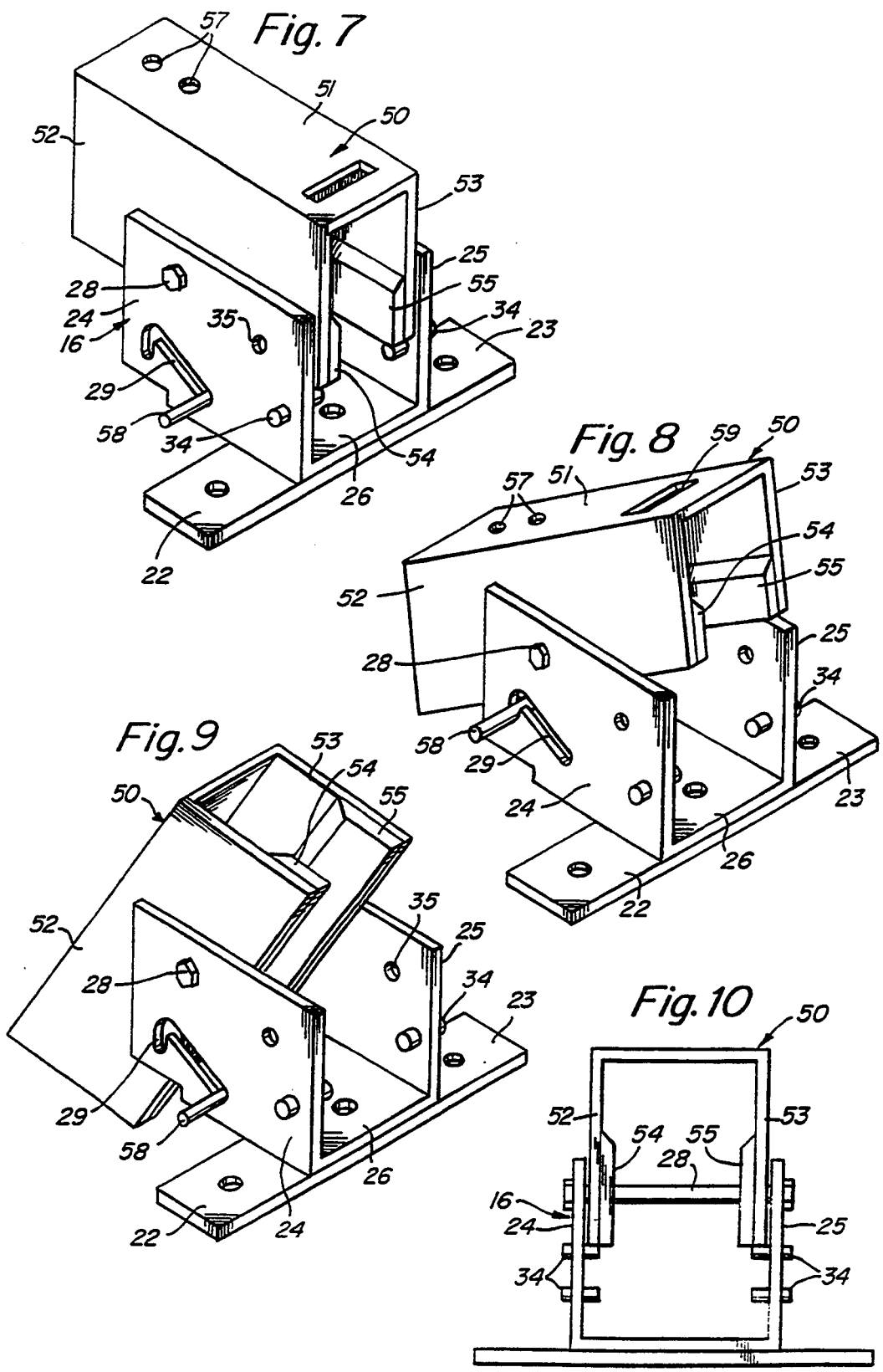

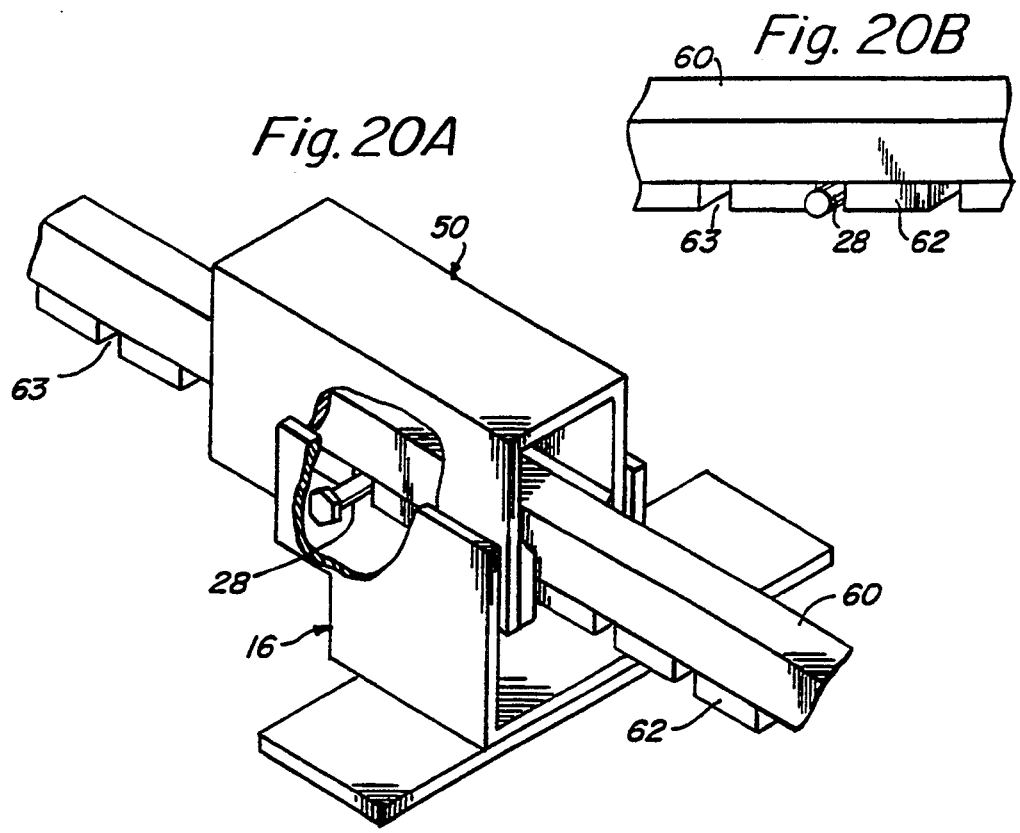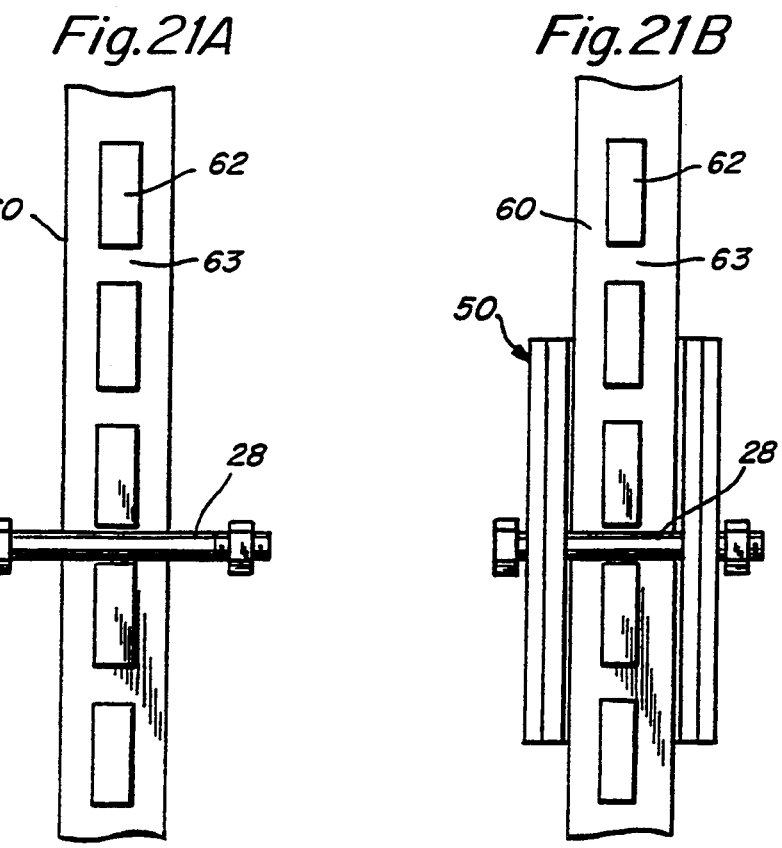

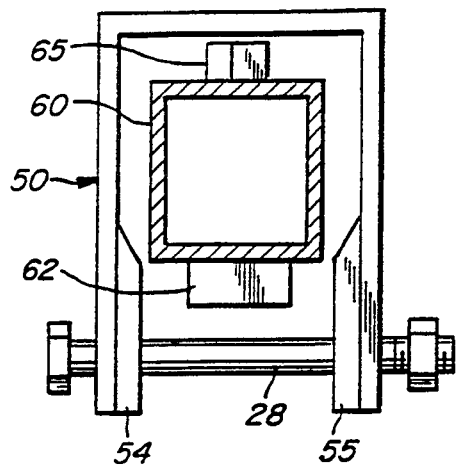
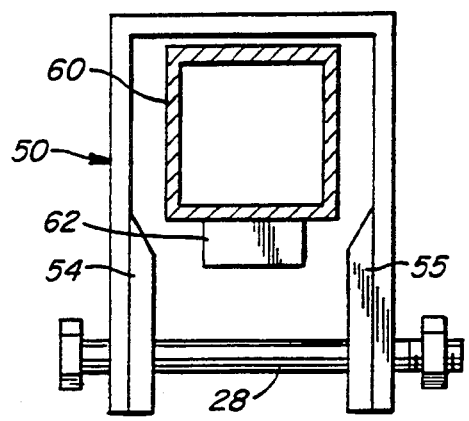
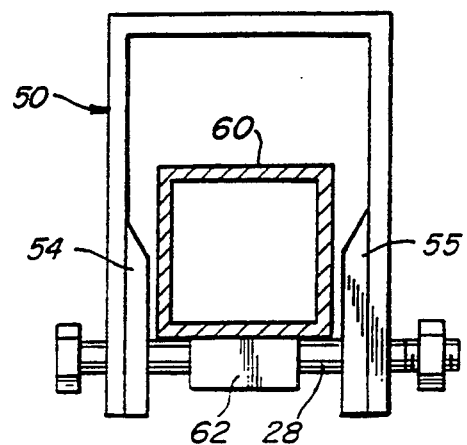

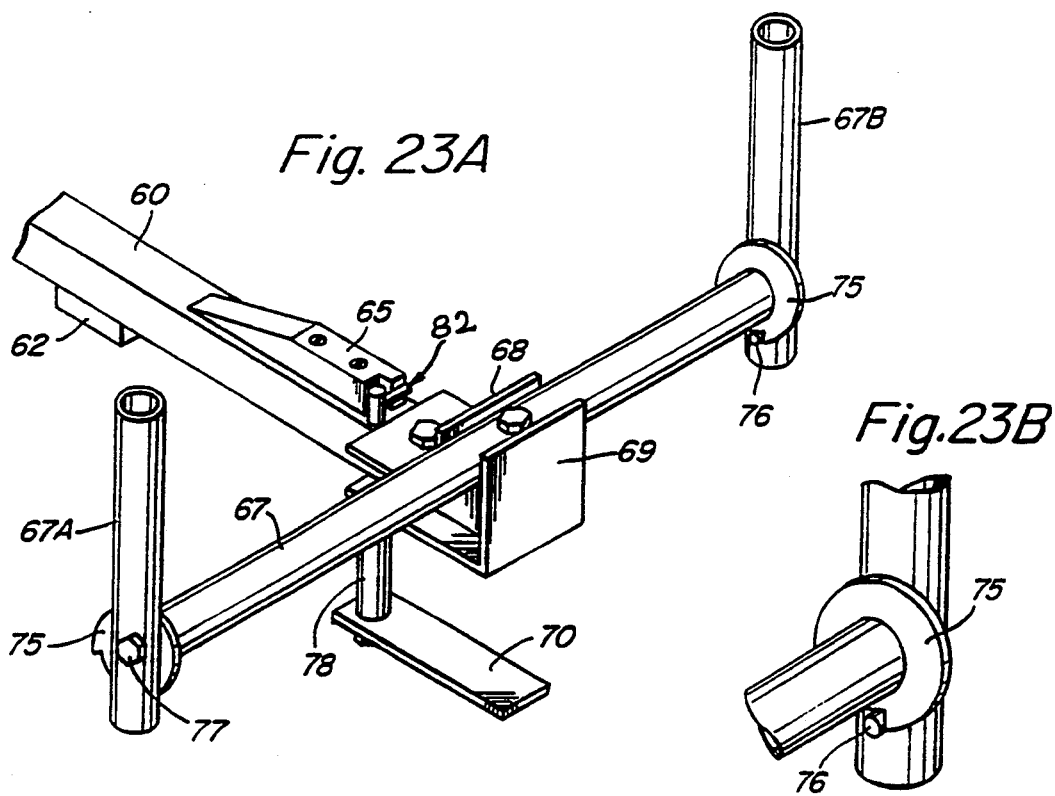
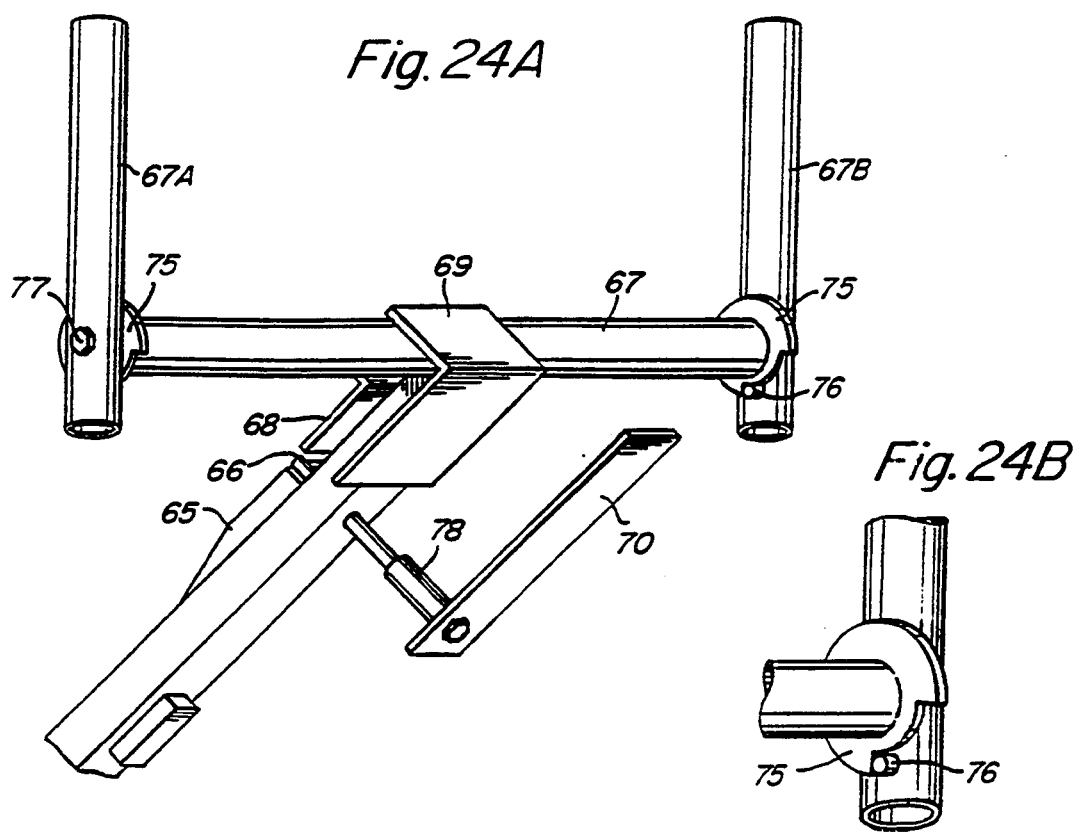

ADJUSTABLE HANDLEBAR FOR BICYCLE

RELATED APPLICATION

This application is a continuation of the following earlier filed and copending applications on related subject matter:

Ser. No. 07/404,867, filed Sept. 8, 1989 and now granted as U.S. Pat. No. 5,121,652, issued on Jun. 16, 1992.

Ser. No. 07/898,466, filed Jun. 15, 1992 and now U.S. Pat. No. 5,253,266 issued on Nov. 9, 1993.

BACKGROUND OF THE INVENTION

The present invention relates in general to an adjustable handlebar apparatus for support on a bicycle frame.

The conventional handlebar has little if any adjustability thereto and this makes the use of the bicycle many times uncomfortable. Depending upon the intended use of the bicycle or the particular person driving the bicycle, the conventional handlebar arrangement is not adequate.

Accordingly, it is an object of the present invention to provide an improved adjustable handlebar apparatus.

Another object of the present invention is to provide an adjustable handlebar apparatus that permits the handlebar to pivot in an up and down direction.

A further object of the present invention is to provide an adjustable handlebar apparatus that permits the handlebar to be slid forward and rearward.

Still another object of the present invention is to provide an adjustable handlebar apparatus that enables both pivoting and sliding action of the handlebar.

A further object of the present invention is to provide an improved adjustable handlebar apparatus that permits interlocking of the handlebar in different forward to back positions.

SUMMARY OF THE INVENTION

To accomplish the foregoing and many other objects of this invention, there is provided an adjustable handlebar apparatus for support on a bicycle frame. This adjustable handlebar apparatus comprises a base member, clamp means for securing the base member to the bicycle frame, and a rocker member disposed on the base member. The base member may be of channel shape and the rocker member may also be of channel shape with the rocker member adapted for pivotal support in the base member. The rocker member also supports a slidable handlebar assembly. This handlebar assembly includes a handlebar, a slide member and means securing the handlebar to the rear end of the slide member. The handlebar assembly interlocks in different longitudinally-disposed positions in the rocker member. Associated with the handlebar assembly is preferably a catch that provides locking of the handlebar assembly to the rocker member upon manual manipulation thereof by the operator. This interlocking prevents the handlebar assembly from being pulled out of the rocker member particularly when the rearward pressure is applied on the handlebar assembly such as when pedaling up hill. The handlebar assembly preferably also supports a wedge member for providing tilting of the handlebar assembly away from the bicycle wheel particularly in the fully forward position of the handlebar assembly.

BRIEF DESCRIPTION OF THE DRAWINGS

Numerous other objects features and advantages of the invention should now become apparent upon a reading of the following detailed description taken in conjunction with the accompanying drawings, in which:

FIG. 7 is a perspective view illustrating the base member and channel member assembled together;

FIG. 8 is a perspective view illustrating the base member and channel member with the channel member in a partially tilted position;

FIG. 9 is a perspective view of the base member and channel member with the channel member in a more fully tilted position;

FIG. 10 is a rear view illustrating the base member and channel member;

FIG. 20 is a perspective view illustrating the manner of interlocking of the adjustable handlebar with the channel rocker member;

FIG. 21 illustrates the interlocking of the adjustable handlebar with the channel member;

FIG. 22 illustrates the different positions of the adjustable handlebar relative to the support rocker;

FIG. 23 is a fragmentary perspective view illustrating the adjustable handlebar and control lever;

FIG. 24 is a perspective view illustrating a fragment of the adjustable handlebar and control lever;

DETAILED DESCRIPTION

Figure 1:
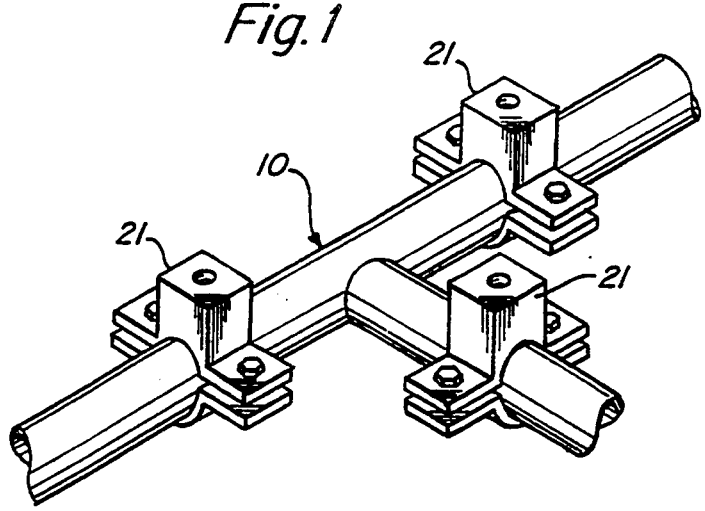
FIG. 1 is a perspective view showing the clamps of the present invention as used on a bicycle handlebar.

Reference is now made to the drawings herein for an illustration of the adjustable handlebar assembly of the present invention. In this regard, in FIG. 1 there is shown the existing handlebar 10 to which the adjustable handlebar of the invention is attached. Also refer in this regard to FIG. 29 which shows a fragmentary view of the bicycle at 12 with the bicycle handlebar 10. Supported from the bicycle handlebar 10 is the adjustable handlebar assembly 14 of the present invention. This adjustable handlebar assembly 14 comprises a base member 16, a channel shaped rocker member 18 and the adjustable handlebar 20.

In FIG. 1 there are illustrated a series of three clamps 21. Each of these clamps are two piece clamps as noted having bolts for securing the two parts of the clamp together. These clamps are used for securing the adjustable handlebar assembly of the present invention to the bicycle.

Figure 2:
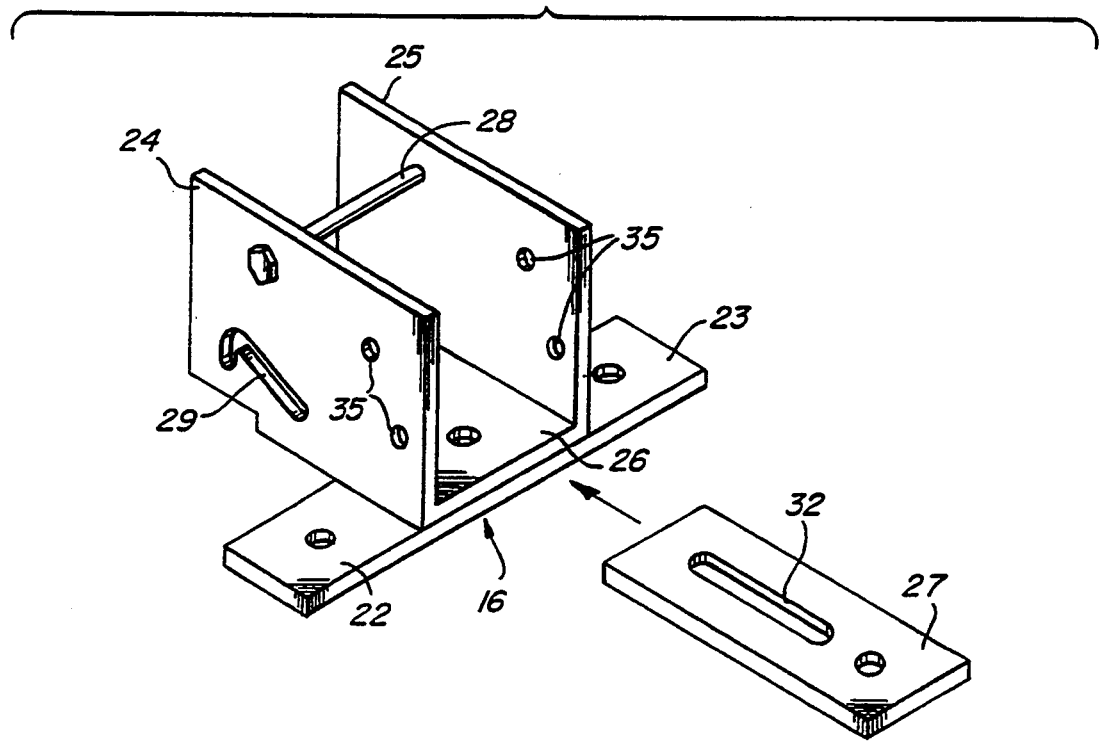
FIG. 2 is a perspective view of the base member of the handlebar assembly.

Reference is now made to FIG. 2 which shows one embodiment of the base member 16. This is in the form of a U-shaped channel having flanges 22 and 23 and sidewalls 24 and 25 interconnected by base 26. FIG. 2 also illustrates the slidable adjusting member 27. Also note in FIG. 2 the bolt 28 which provides a pivot, to be described hereinafter. In addition, the sidewall 24 is provided with a hook-shaped slot 29.

Figure 3:
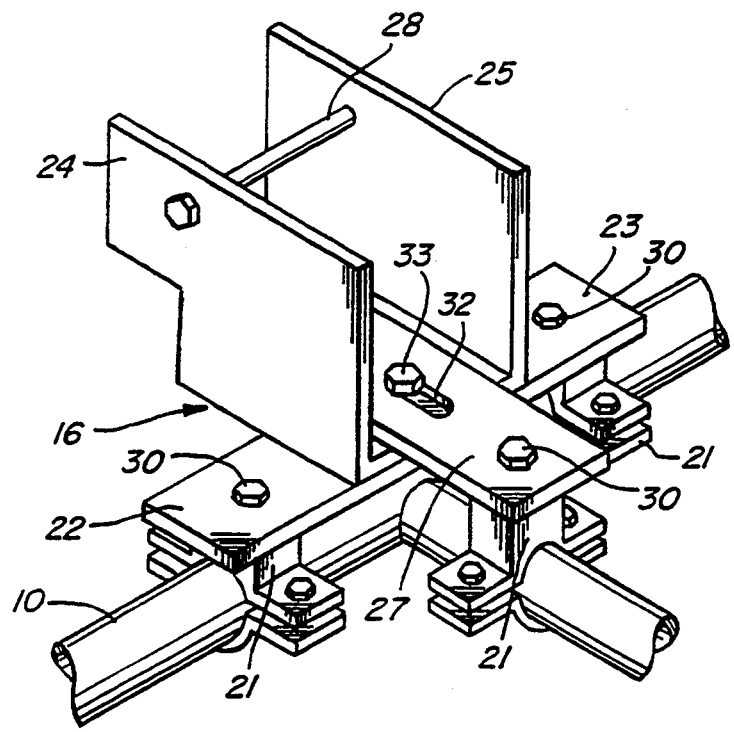
FIG. 3 is a perspective view of the base member on the existing bicycle handlebar.

Reference is now made to FIG. 3 which shows the assembly together of the base member 16 with its slidable adjusting member 27, supported on the clamps 21. Note the bolts 30 that are used to secure the flanges 22 and 23 to two of the clamps 21. There is also a bolt 30 that secures the slidable adjusting member 27 to the third clamp 21. The member 27 has an elongated slot 32 and there is also provided a further bolt 33 that passes through the base 36 of the member 16. The member 27 is an adjustable slotted flat piece that allows the clamp to slide on the neck of the handle bar. The reason for this is that some handlebars have longer or shorter necks and this provides a ready adjustment.

Figure 4:
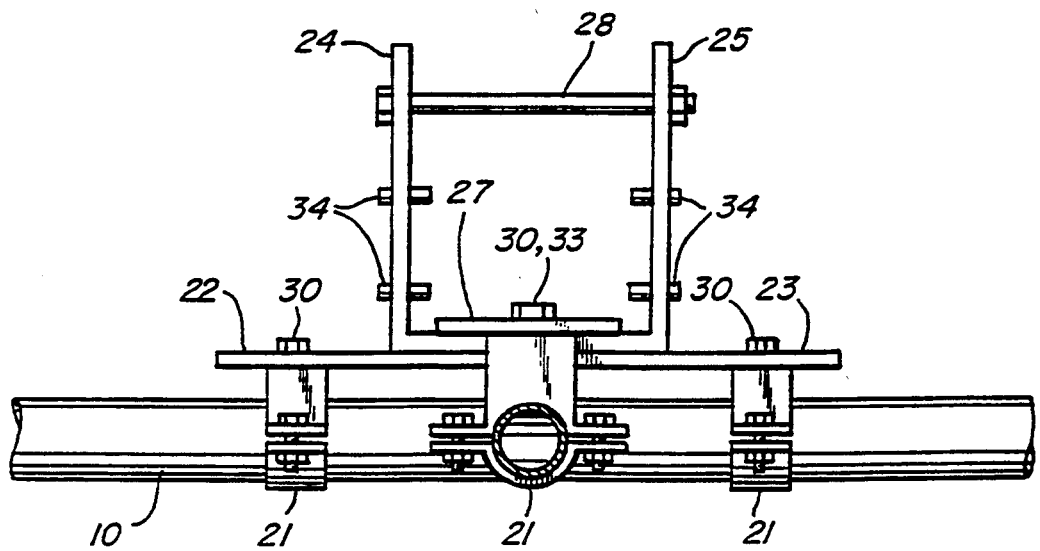
FIG. 4 is a rear view showing the base member clamped to the bicycle handlebar.

Reference is now made to FIG. 4 that also shows the base member 16 as clamped on the handlebar of the bicycle. FIG. 4 also shows adjustable pins 34 that are provided in holes and slots in the sidewalls 24 and 25.

Figure 5:
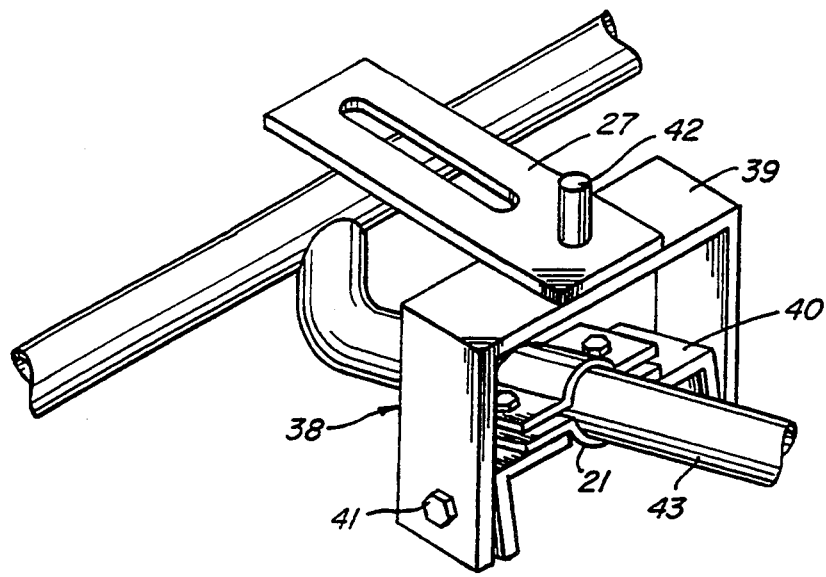
FIG. 5 is a perspective view of a special support member that may be used in association with the base member.

Reference is now made to FIG. 5 for an illustration of a special support member 38 that is comprised of channel member 39 and 40. The member 40 is supported from the clamp 21 and the members 39 and 40 are interconnected in a pivotal manner by means of the pivot bolt 41.

FIG. 5 also shows the adjustable slide member 27 over the bolt, and extending at the other end so that it can engage with the base nerobet which is now shown in FIG. 5. The particular arrangement illustrated in FIG. 5 is in particular adapted for use with handle bars that are not straight such as the version of handlebar illustrated in FIG. 5.

It is noted that the claim 21 in FIG. 5 may be slid back and forth on the neck 43. Furthermore, the member 39 may be pivoted relative to the member 40 so as to provide the proper orientation of the member 27 which is adapted to be interlocked by bolting such as illustrated in FIG. 3 with the base member 16. In FIG. 5, the base member 16 is not illustrated.

Figure 6A:
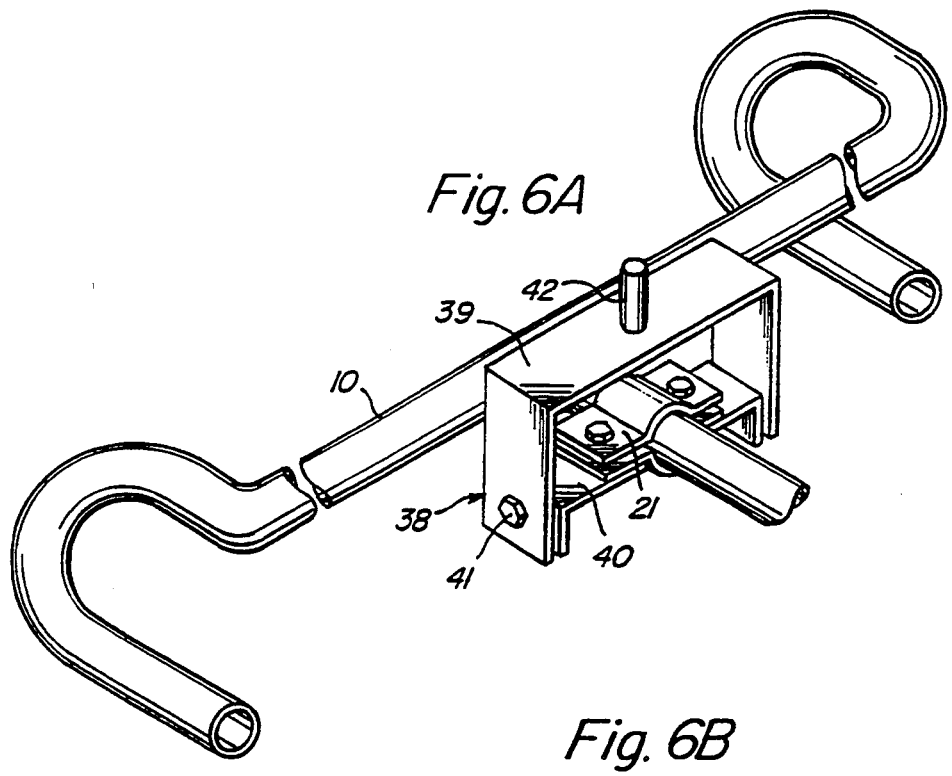
FIG. 6 illustrates the support member clamped to the neck of the handlebar in an upright position.
Figure 6B:
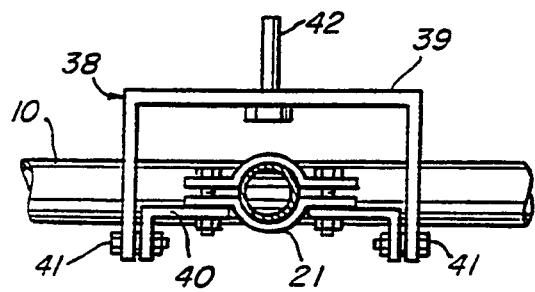

FIG. 6 illustrates, for the most part, the same support member 38. This is shown installed on a straight handlebar to illustrate the versatility and adjustability of the stabilizer.

Reference is now made to FIG. 7 for a further perspective view illustrating other components of the adjustable handlebar assembly. In FIG. 7 there is illustrated a perspective view of additional components of the adjustable handlebar assembly. There is illustrated the aforementioned base member 16 that is comprised of sidewalls 24 and 25 interconnected by base 26. These walls form a channel member that is dimensioned so as to receive a further channel member therein in an oppositely inverted position as illustrated in FIG. 7. This channel member is referred to herein as a rocker member illustrated in FIG. 7 as the rocker member 50. The rocker member 50 has a top wall 51 and sidewalls 52 and 53. It is noted that the aforementioned bolt 28 also passes through holes in the rocker member 50 so that the rocker member 50 is pivotally supported in a rocking fashion from the base member 16.

FIG. 7 also illustrates, inside of the rocker member 50, the beveled guide members 54 and 55. These guide members are provided so that the adjustable handlebar, to be described hereinafter falls into the narrower slot therebetween when the bolt 28 is engaged by teeth in the adjustable handlebar. Again, reference will be made hereinafter to the adjustable handlebar and its mode of interengagement in the rocker member 50.

FIG. 7 also illustrates the pins 34 that are used in certain of the holes 35. These pins limit the rotation in one direction of the rocker member 50. They may be provided in different of the holes so as to stop the rocker member at the desired level or angle. The object is to give the adjustable handlebar different desired angles. Note in FIG. 7 that the rear bottom edge of the rocker member 50 is seated against the lower disposed pins 34.

In FIG. 7 it is also noted that in the top wall 51 there are provided a couple of holes 57. These are used so that the rocker member may be employed as a base to hold other objects.

FIG. 7 also illustrates the hook-shaped slot 29 having associated therewith the pin 58. The pin 58 is used to provide limiting support for the rocker member 50. Reference will be made hereinafter to the pin 58.

Reference is now made to FIG. 8 for an illustration of the rocker member 50 in a partially tilted position. In this position it is noted that the pin 58 has been moved to the forward end of the slot 29. Also note that the rocker member 50 is now limited to the inclined angle shown in FIG. 8 by virtue of the bottom surface thereof resting against the pin 58. The pin 58 preferably has a washer and nut on the outside to keep it from falling out. The washer and nut are not illustrated in FIG. 8.

In FIG. 8 there are also shown the holes 57 previously referred to and also shown is a further slot 59 to be described in further detail hereinafter. In FIG. 8 it is also noted that the rocker member 50 is wider at the top so that the handle bar will have greater space on the sides, when lifted out of the narrower bottom section of the member defined between the guides 54 and 55. The reason for this is to provide the handlebar room so that it will not jam against the sides when sliding the handlebar forward or rearward. Also, when lifting the handlebar up to the wider part of the channel the handlebar becomes disengaged with the gear. Otherwise the handlebar would not be able to slide forward or rearward.

Reference is now made to FIG. 9 for an illustration of the base member and associated rocker member 50. The rocker member 50 in this particular view is shown in a most tilted position. It is noted that the pin 58 is now slipped in the slot 29 to more backward position. By doing this there is provided a deeper angle so that the rocker member 50 may be tipped forward even further as illustrated.

Reference is now also made to FIG. 10 which is a rear view illustrating the pivoting of the rocker member 50 by means of the pivot bolt 28 secured between the sidewalls of the base member 16. In this particular view the rocker member is illustrated in its horizontal position. In FIG. 10 also note the pins 34. The rocker member 50 is illustrated resting against one of the sets of pins 34.

FIGS. 1-10 have illustrated, for the most part, the base member which is supported directly from the bicycle handlebar as well as the rocker member which is pivotally supported from the base member. The rocker member is adapted to receive the adjustable sliding handlebar that is illustrated in the perspective view of FIG. 11. The handlebar assembly 20 comprises a slide member 60 having on the bottom thereof a series of spaced blocks 62 to form a toothed surface having slots 63 provided between the blocks 62. The slots 63 are adapted to receive the pivot bolt 28. In this regard refer to FIG. 20 which will be described hereinafter.

At the forward end of the slide member 60 is disposed a stop bar 64. The stop bar 64 prevents the handlebar from pulling out of the rocker member when it is pulled all the way backward by the operator.

Figure 11:
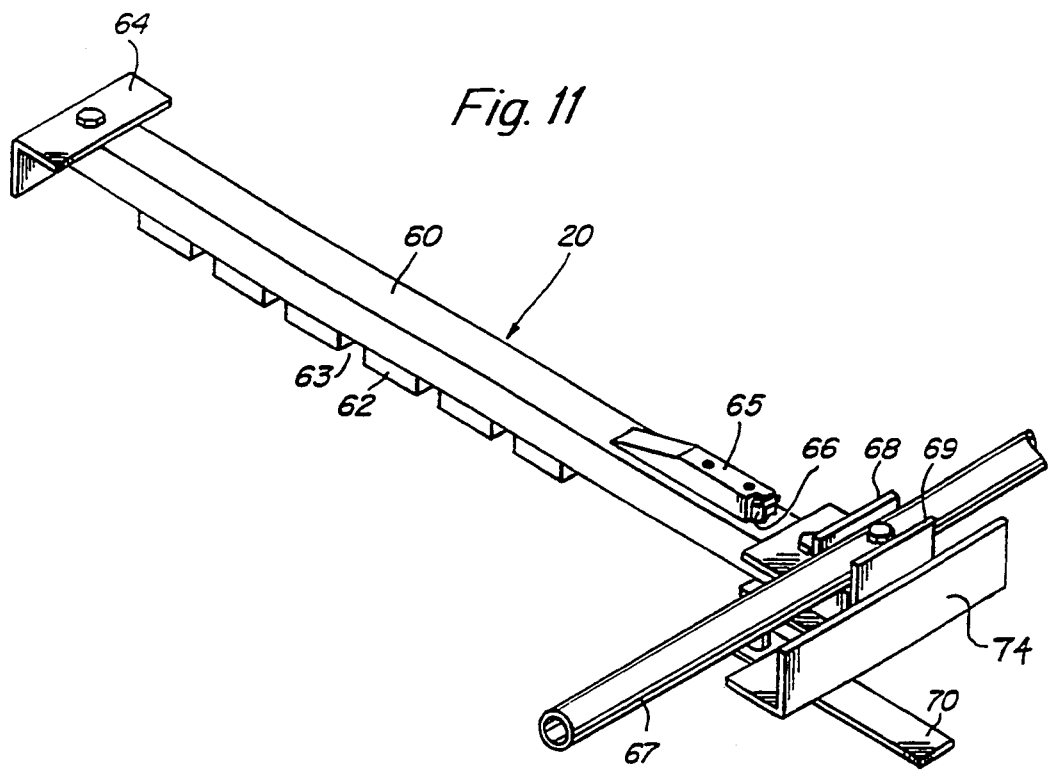
FIG. 11 is a perspective view of one embodiment of the adjustable sliding handlebar in accordance with the invention.

On top of the slide member 60 there is provided a wedge 65 having disposed at the rear side thereof a catch 66 to be described in further detail hereinafter. At the very rear of the slide member 60 is supported the handlebar 67. This may be supported by means of the use of L-shaped angle members 68 and 69. FIG. 11 also shows the control lever 70 that is adapted to operate the catch 66 all to be described in further detail hereinafter.

The purpose of the wedge 65 is to cause the handlebar to lift upward when inserted all the way into the rocker member. This prevents the very forward end of the handlebar from interletting with the bicycle front tire.

Figure 12:
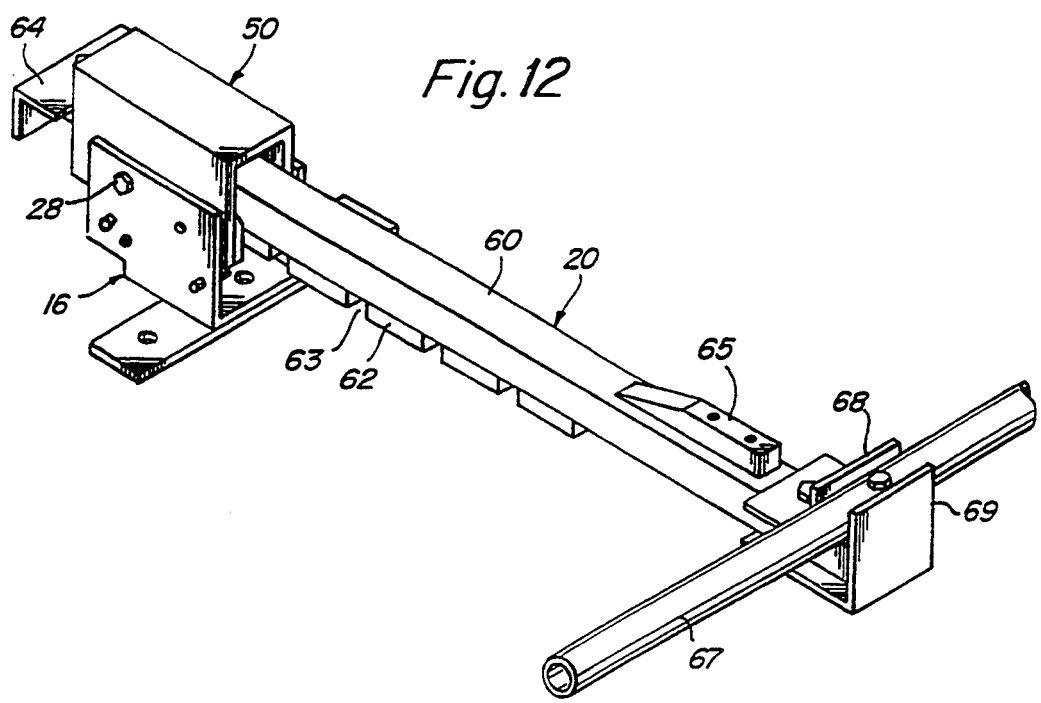
FIG. 12 is a perspective view of the adjustable sliding handle bar inserted in the channel member or rocker member.

Reference is now made to FIG. 12 for a further illustration of the adjustable sliding handlebar shown in FIG. 12 now inserted into the rocker member 50. Also illustrated in FIG. 12 is the stop bar 64 shows substantially engaging the end of the rocker member 50 preventing the handlebar assembly from sliding out of the rocker member.

The slide member 60 of the handlebar assembly has one of its slots 63 extend down over the bolt 28 for essentially engaging the bottom of the slide member. The slide member with its blocks 62 essentially forms a lower gear surface that is toothed so as to provide engagement between the handlebar assembly and the rocker member at different relative longitudinal positions therebetween.

FIG. 12 also shows the wedge 65. For the sake of simplicity the catch associated with the wedge is not illustrated in FIG. 12. FIG. 12 also shows the L-shaped angle members 68 and 69. These angle members are bolted to the handlebar tube 67 to hold the handlebar in place. In this regard, also note the handlebar 67 illustrated in FIG. 29.

Figure 13:
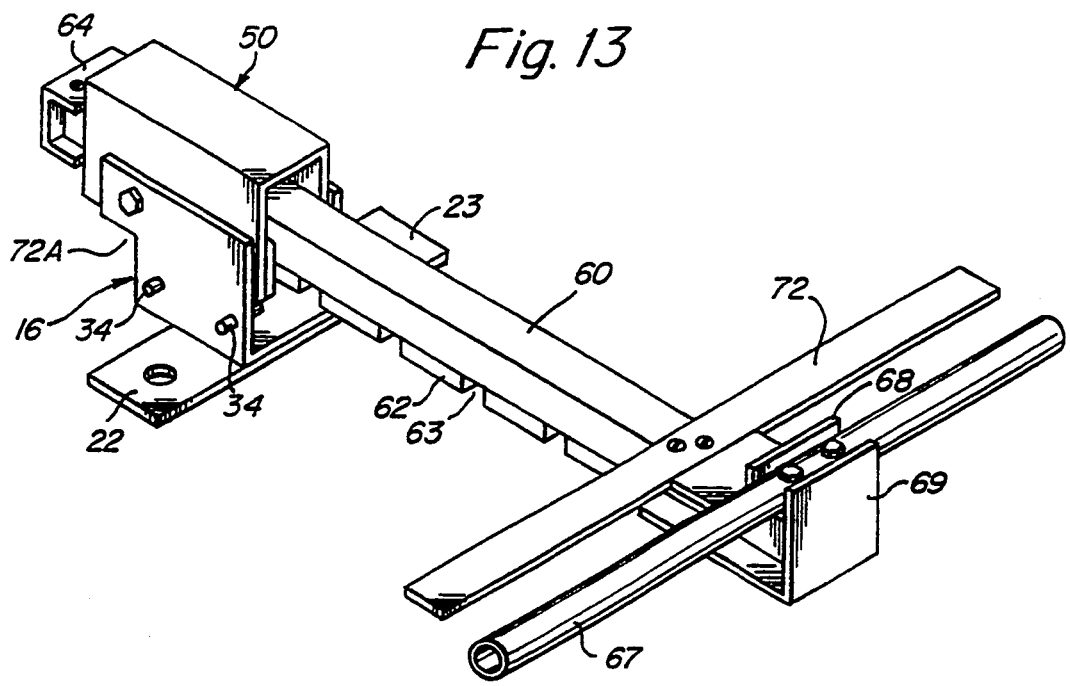
FIG. 13 illustrates an alternate embodiment of an adjustable handlebar supported in the channel rocker member.

Reference is now made to FIG. 13 for an illustration of a slightly different embodiment of the handlebar assembly. For the most part the handlebar assembly is the same as illustrated in FIG. 12. However, at the rear end thereof in place of or in conjunction with the wedge 65 there is provided instead a flat bar 72. The flat bar 72 may be used for support of parts of a brake system used with the bicycle. The wedge number 65 not illustrated in FIG. 13 may be secured over the flat bar 72. FIG. 13 also shows the angle members 68 and 69, used for securing the handlebar 67 with the use of bolts as illustrated.

FIG. 13 also illustrates a pair of pins 35 that may be on either side of the base member 16 for controlling the position of the rocker member at least in one angle thereof.

FIG. 13 also illustrates a cut-out at 72. It is noted that this cut-out is larger than, for example, the one illustrated in FIG. 12. The depth of this cut-out, in relationship to the placement of the bolt 28 can be used to determine the degree of upward tilt of the rocker member 50. The deeper the cut-out the more tilt that is obtained.

Figure 14:
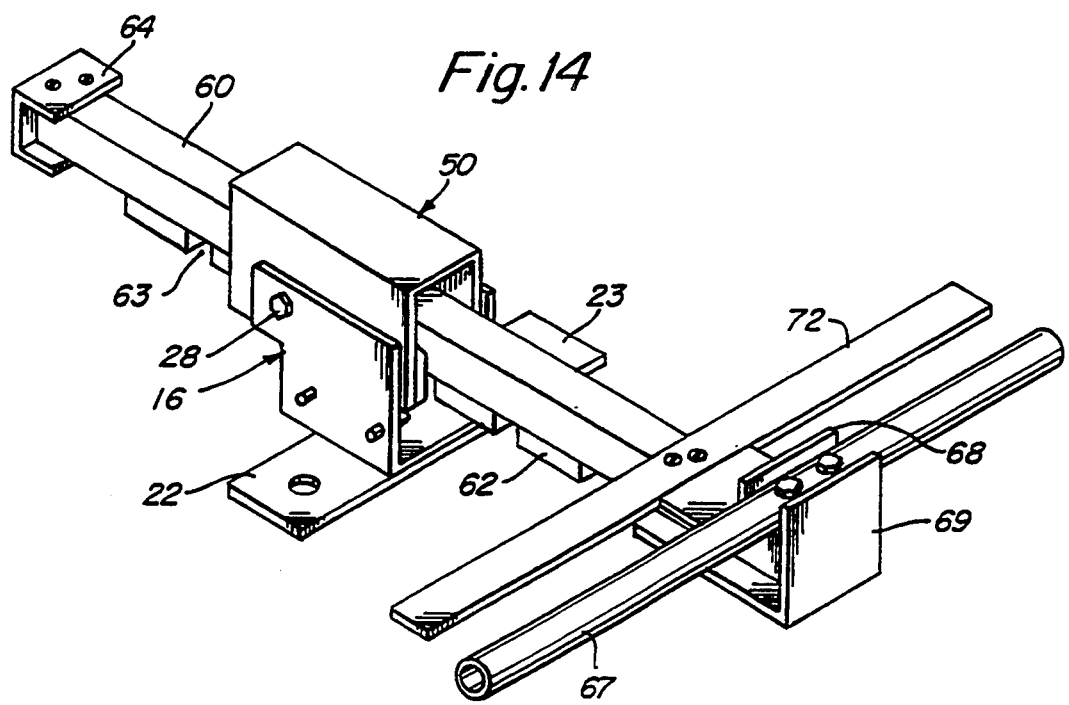
FIG. 14 is a perspective view of the embodiment of FIG. 13 with the handlebar in an intermediate position.

Reference is now made to FIG. 14 for an illustration of the handlebar assembly in a construction substantially the same as that illustrated in FIG. 13. However, in FIG. 14 the handlebar slide member 60 is shown in a more intermediate position relative to the rocker member 50. The teeth in the slide member 60 engage the bolt 28 and thus the handlebar slide member 60 is now engaged in the narrower slot portion defined between the members 54 and 55 disposed inside of the rocker member 50.

The narrower part inside of the rocker member 50 is provided in order to provide stability and take away any sloppyness in the handlebar. This is particularly necessary when turning corners. On the other hand, when the handlebar is lifted up so as to be slid in the rocker member 50, then the slide member 60 is in the upper part of the rocker member where there is sufficient side play to enable easy longitudinal movement of the slide member 60.

It is noted that the slide member 60 of the handlebar assembly may be manipulated to stop in any of the different gear positions that are chosen. One can change from gear to gear while the bike is being ridden. Furthermore, the handlebar may be tipped up or down while the bike is being ridden such as from the position of FIG. 14 to the position of FIG. 15.

Figure 15:
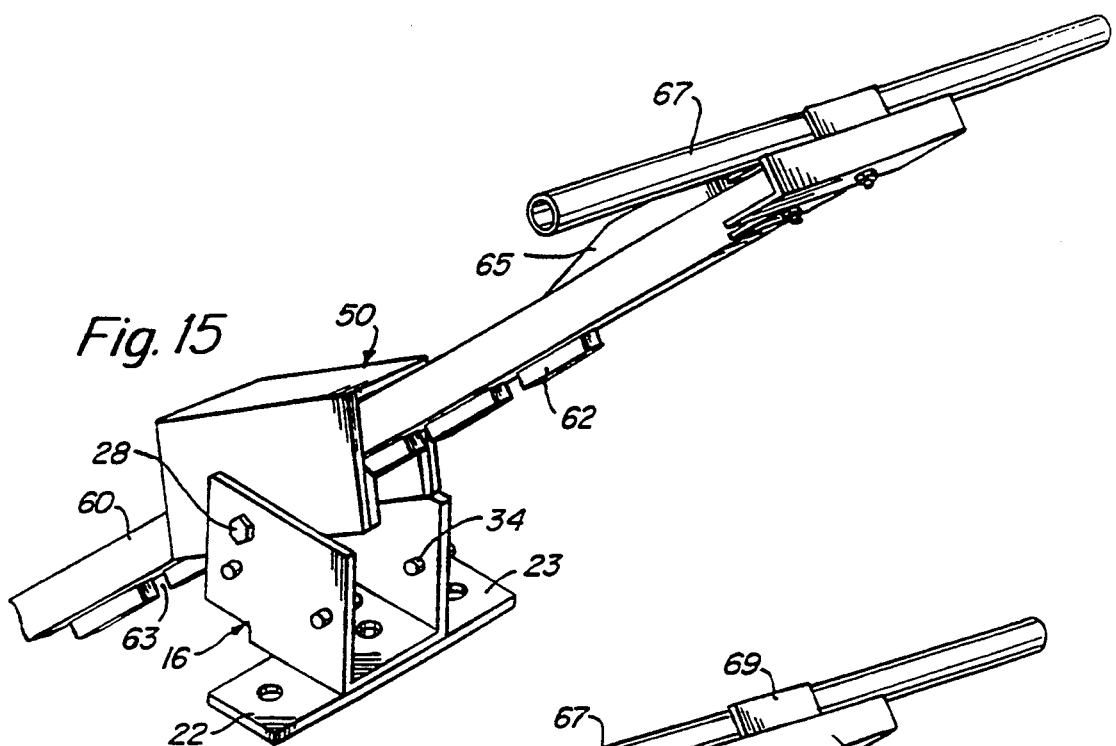
FIG. 15 is a perspective view of the adjustable handlebar in a partially tilted position.

Now, reference is made to FIG. 15. The apparatus illustrated in FIG. 15 is substantially the same as that illustrated in FIG. 14 but the handlebar and in particular the slide mere/per 60 thereof is shown now tipped into a more upward tilted position. It is noted that in this position the wedge member 65 is still out of engagement with the rocker member 50. FIG. 15 in the following illustrations show how the wedge is used to lift the handlebar into an upward position when fully inserted into the rocker so as to prevent interference of the elongated slide member with the front wheel of the bicycle.

Figure 16:
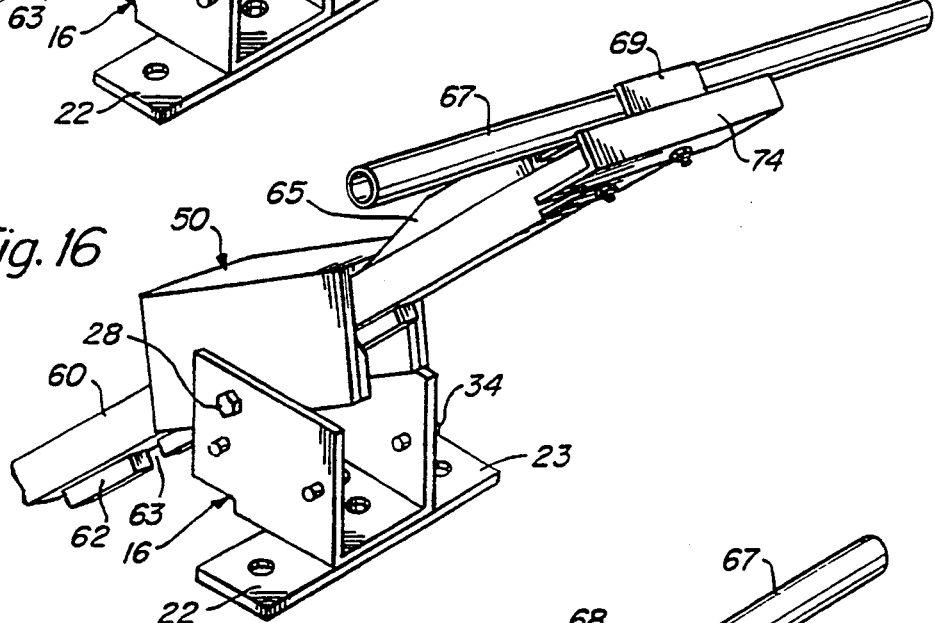
FIG. 16 is a perspective view of the adjustable handlebar in a tilted position and a substantially inwardly disposed position.
Figure 29:
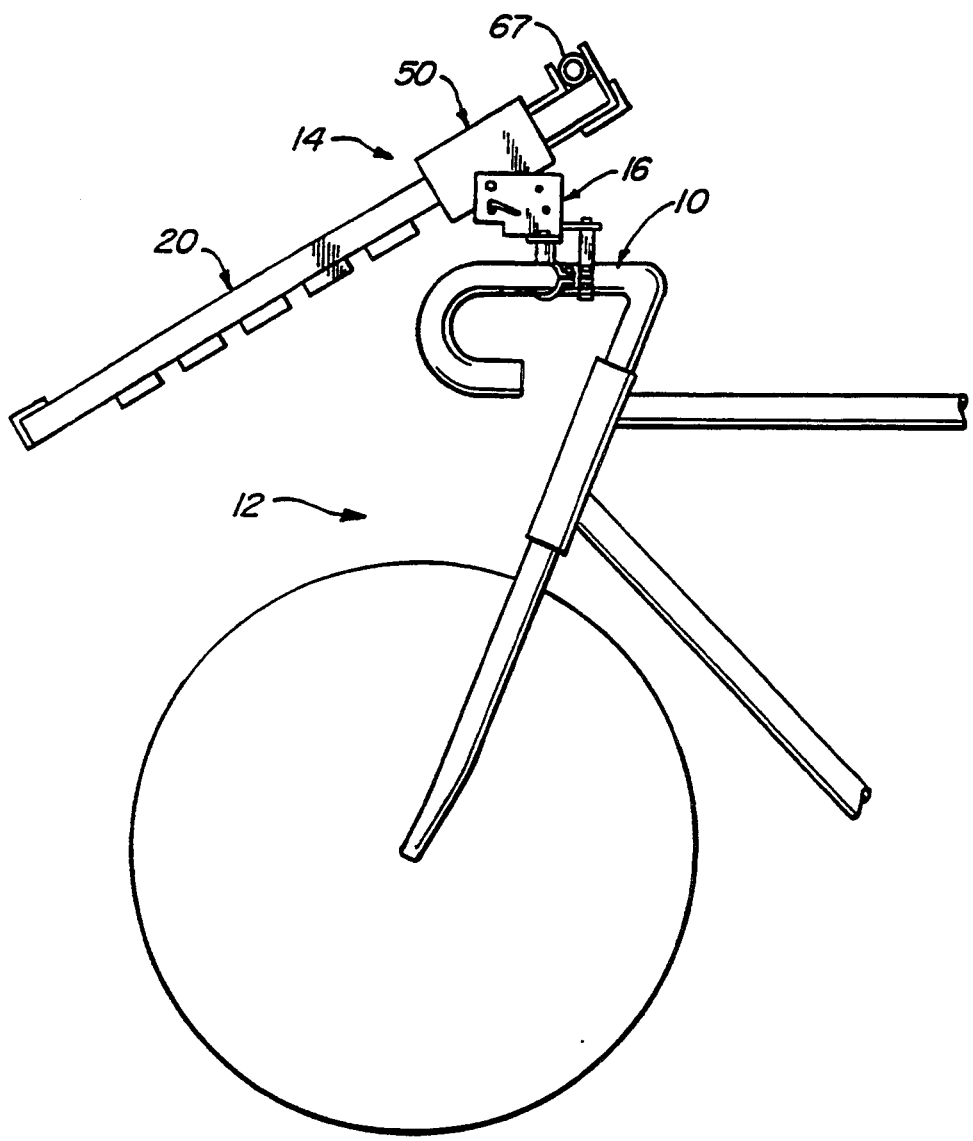
FIG. 29 illustrates the adjustable handlebar of the present invention in a partially tilted position and also in a position in which the handle bar is extending fully inward or in its more forward position.

Reference is now made to FIG. 16 for an illustration of a subsequent positioning of the slide member 60 as the handlebar assembly is pushed into its more forward or inward position. The handlebar assembly is now moving toward the more forward position such as illustrated in FIG. 29. In FIG. 16, it is noted that the wedge member 65 is now just contacting the rocker member 15 at the very front edge of the wedge member 65.

FIG. 16 also illustrates the angle member 74 that is secured with the other angle members just below but forward of the handlebar 67. The member 74 provides a thumb pressure plate to help when lifting the handlebar and in particular the slide member 60 upwardly for sliding the handlebar assembly in and out. By grasping the handlebar 67 and putting the thumbs on the member 74 then the slide member 60 may be disengaged from the bolt 28 so that the slide member 60 of the handlebar assembly may be moved to different interlocked positions between blocks 62 forming the lower gear arrangement on the slide member 60.

Figure 17:
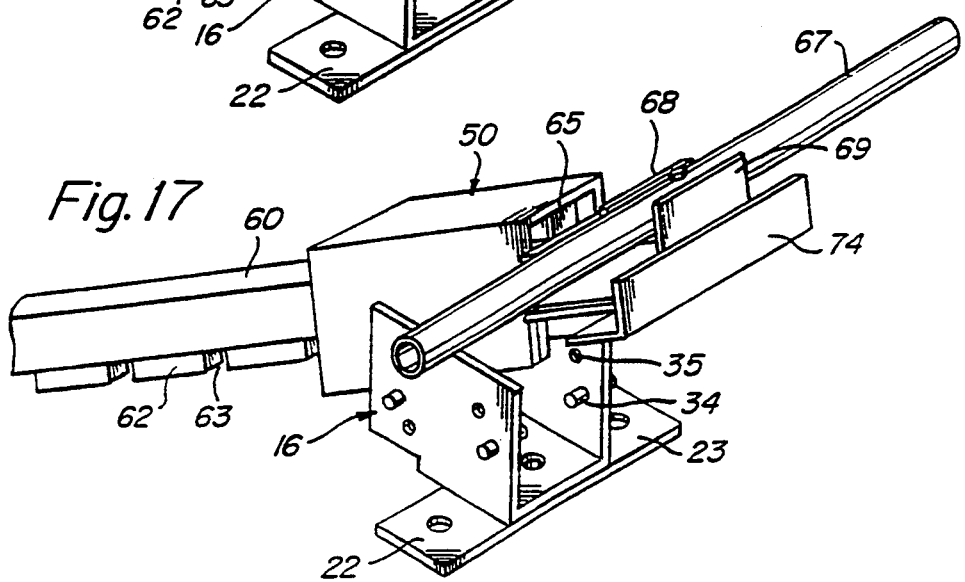
FIG. 17 is a perspective view illustrating the handlebar in a tilted position and fully extending into the support channel rocker.

Reference is now made to FIG. 17 which shows the following sequence. With the slide member 60 engaged with one of its slots 63 engaging with the bolt 28, when moved to the position of FIG. 17 the wedge member 65 is tipped into a more upward position because the wedge member tends to move the handlebar 67 downwardly thus moving the very forward end of the slide member 60 upwardly. This is to prevent interference with the front wheel of the bicycle. In FIG. 17 the handlebar assembly is shown fully inserted into the rocker member. FIG. 17 also shows the thumb pressure plate surface of angle member 74.

Figure 18:
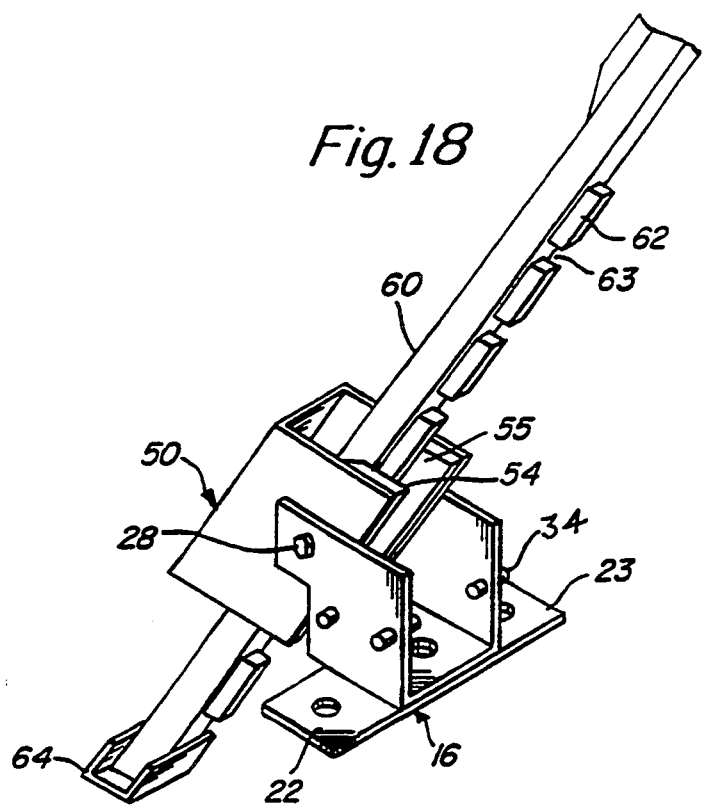
FIG. 18 is a perspective view illustrating the adjustable handlebar in a maximum tilted position.

Reference is now made to FIG. 18 for a further illustration of the position that may be obtained with the adjustable handlebar assembly. In FIG. 18 the rocker member 15 is shown in a substantially tilted position. The gear on the slide member 60 of the handlebar assembly is engaged with the bolt 28 to hold the handlebar at this desired length.

Figure 19:
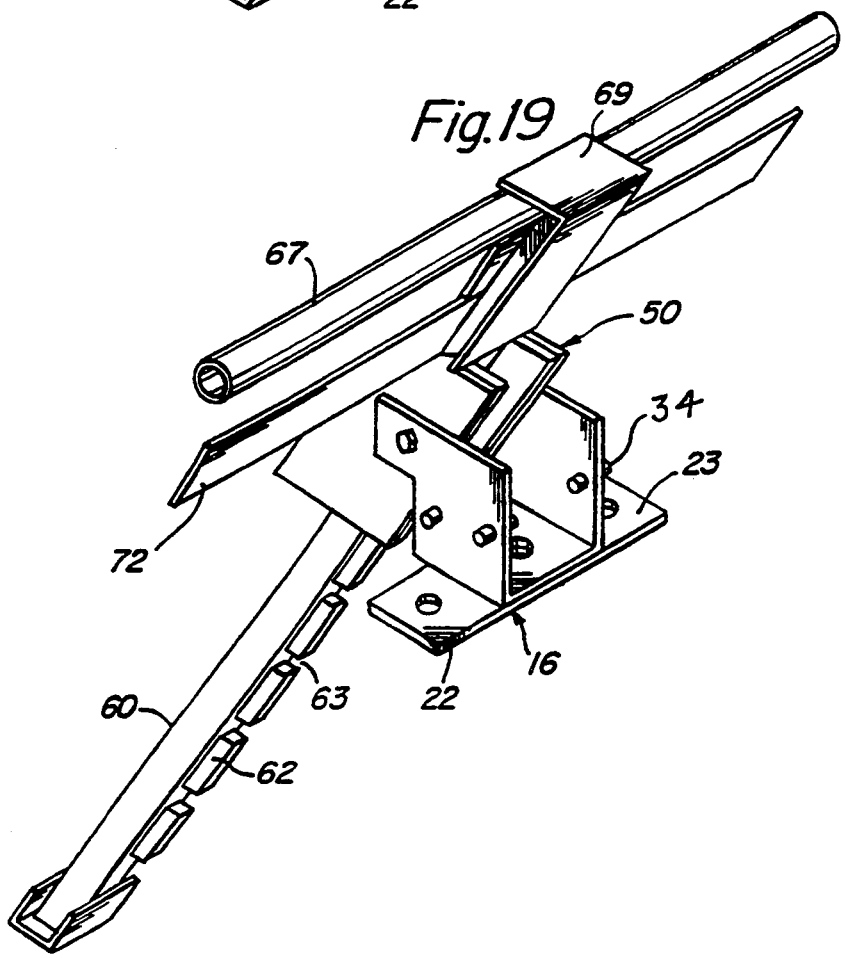
FIG. 19 is a perspective view illustrating the handlebar in a fully tilted position and also in a position in which the handlebars is disposed fully inward.

Reference is now made to FIG. 19 for an illustration of the handlebar 67 now all the way down into the rocker member 50. The rocker member 50 is also illustrated in a substantially tilted position. The tilt of this position of the rocker member may be controlled by virtue of the placement of one of the pins 35 illustrated in FIG. 19.

Reference is now made to FIG. 20 for a clear illustration of the manner in which the adjustable handlebar engages with the rocker member 50. In FIG. 20 the members are cut-away so as to clearly illustrate the bolt 28 engaging with one of the slots 63 provided between adjacently disposed blocks 62 forming the essential gear structure at the bottom of the handlebar slide member 60. Again, the slide member 60 may be engaged such as at the angle 74 by the thumbs to cause a pivoting therefrom to lift the slide member 60 for sliding in the upper part of the rocker member 50 to move the slide member 60 between different engaging positions with the bolt 28.

Reference is now made to FIG. 21 for an illustration of the manner in which the teeth defined between block 62 engages with the bolt 28. FIG. 21 illustrates bottom views essentially also illustrating the manner in which the bolt 28 engages between sidewalls of the rocker member 50.

Reference is now made to FIG. 22 that essentially is a cross-sectional view illustrating the position of the slide member 60 for different relationships with respect to the rocker member 50. In FIG. 22A the slide member 60 of the handlebar assembly is shown in an uppermost position when it is being moved longitudinally from one interlocking position to the next. Note in FIG. 22A the wedge member 65.

In FIG. 22B the slide member 60 is also shown in a more uppermost position. This view shows the tubular nature of the member 60 illustrating it when it is up into the wider part of the channel in the rocker member. It is moved to this position so as to give room so that the handlebar can slide freely without jamming against the sides.

Finally, in FIG. 22C there is shown the member 60 down in the narrower part of the channel defined between the guides 54 and 55. This prevents shifting from side to side and gives the necessary stability for maneuvering the bicycle while engaging with the gear at the same time when in this lowermost position.

Reference is now made to FIG. 23 for an illustration of further features of the present invention. In FIG. 23 there are illustrated the angle members 68 and 69 for securing the handlebar 67. In this version of the invention the very ends of the handlebar 67 are provided with upright handles 67A and 67B, respectively. The upright members 67A and 67B are secured by bolts 77 and have therebetween a special shaped washer 75 adapted to engage the pin 76 extending from each of these upright members 67A and 67B. The washer 75 is provided with a cut-out in it so that the pin may engage with the washer and limit the rotational motion of the uprights 67A and 67B. This motion is between the position illustrated in FIG. 23 and a position about 90° forward thereof.

FIG. 23 also illustrates the control lever 70 which is secured to the catch 66 by means of the support rods 78. The lever 70 permits a lifting of the catch 66 while the operator is operating the bicycle.

As illustrated previously, in FIG. 23 the uprights 67A and 67B have been added to the ends of the handlebar. The pins 76 stop the uprights from going any further forward when the handlebar is in a flat position. However, as illustrated hereinafter in FIG. 24, when the handlebar is lifted up by the operator, the uprights will still stay in a vertical position while the hands have not been moved from the uprights. This is accomplished by the uprights moving as the handlebar goes up. These uprights swivel back and forth when the handlebar goes up or down so one does not have to take their hands off of the uprights to keep from putting strain on ones wrists. The view of FIG. 23 shows the handlebar in a substantially flat position. The washer 75 with a cut-out may be secured to the ends of the handlebar 67 with screws which are not shown.

Reference is now made to FIG. 24 illustrating the adjustable handlebar assembly in a tilted position. However, it is noted that the uprights 67A and 67B may be maintained in a vertical position because they are permitted to rotate. In this regard note that the pin 76 is now at the opposite end of the cut-out in the washer 75.

FIG. 24 also shows the control lever 70 connecting by way of support posts 78 to the catch 66. The catch 66 may screw into the post 78. The post 78 may be secured by means of the bolt at the end of the control lever 70 as illustrated in FIG. 24. The control lever 70 lifts the catch 66 upwardly until it is past the wedge. The lever is then turned by the persons hand to the right as viewed in FIG. 25.

Figure 25:
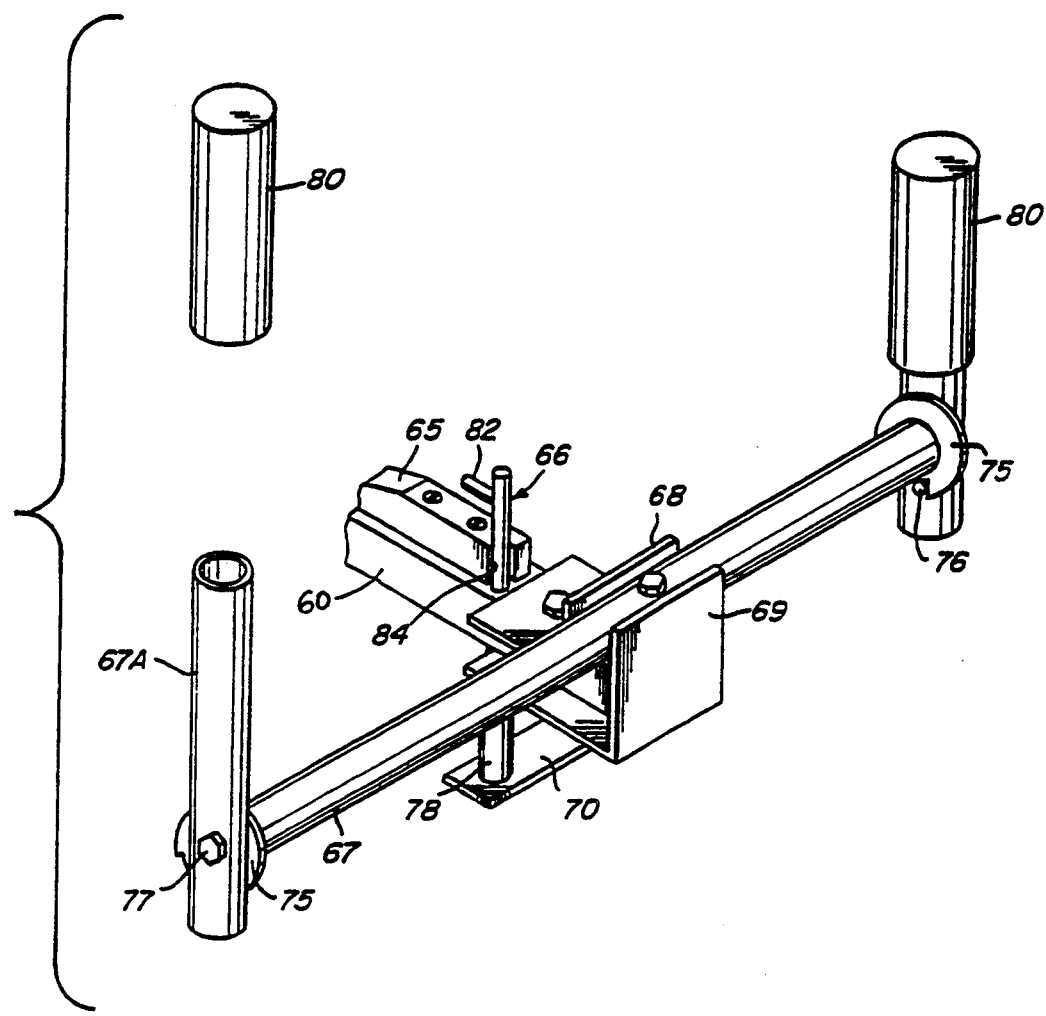
FIG.25 is a fragmentary perspective view illustrating the operation of the catch via the control lever.

Reference is now made to FIG. 25 for an illustration of the control lever 70 having been moved to the right to thus rotate the catch 66 so that the pin 82 of the catch is now directed forwardly over the wedge member 65.

FIG. 25 also shows the ball bearing sleeves 80. This is adapted to fit over the uprights 67A and 67B. These ball bearing sleeves turn on the uprights in either direction, to the left or to the right. This permits the operators hands to stay still on the ball bearing sleeves as the handlebar itself is rotated in turning corners.

As indicated previously, the catch 66 with its interlocking pin 82 is adapted to be rotated by the control lever 70. The reason for this arrangement is to engage with the top of the rocker member, as to be described hereinafter so that the handlebar will not pull out or slide out of the rocker member such as when the person is standing up to pedal the bike as might occur when going up a hill. It is furthermore noted that the catch 66 is accommodated in a rear slot 84 of the wedge member 65.

Figure 26:
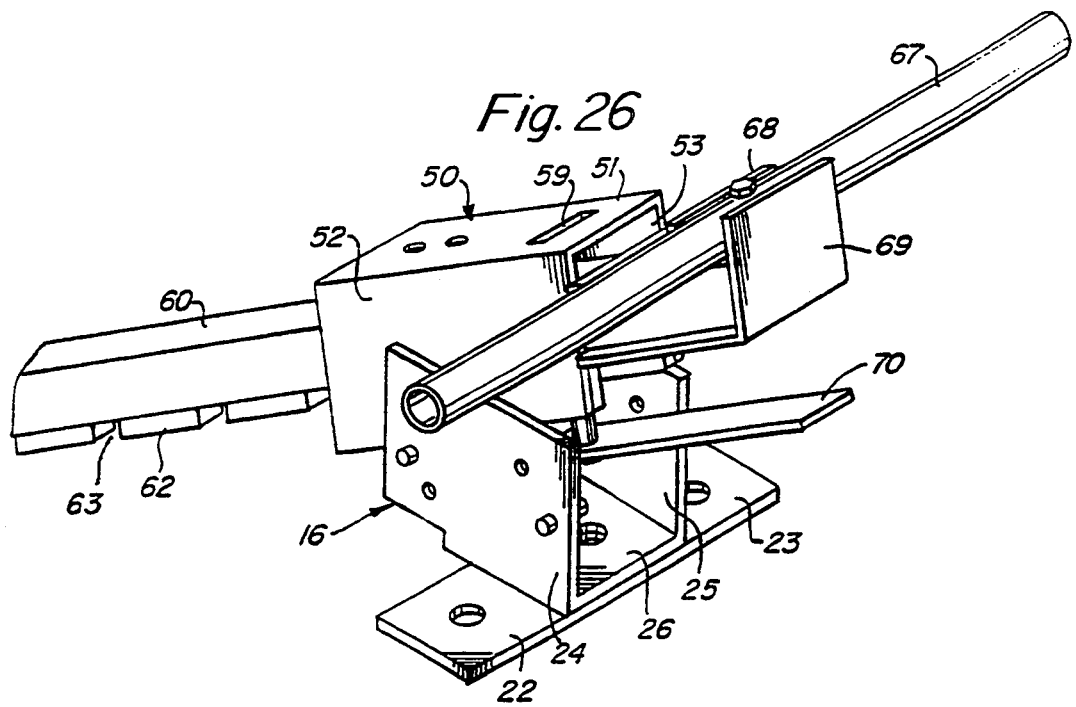
FIG. 26 is a perspective view illustrating a first position of the control lever.

With regard to the securing of the handlebar assembly in the rocker member, reference is now made to FIG. 26. As indicated previously, the control lever 70 is manipulated between different positions so as to control the movement of the catch 66. The securing pin 82 of the catch 66 is adapted to pass through the rectangular slot 59 in the top wall 51 of the rocker member 50. It is noted that in FIG. 26 the handlebar is all the way forward and it is in that position that the control lever may then be operated to interlock the handlebar assembly with the rocker member 50.

Reference is now made to FIG, 27 for an illustration of the control member 70 illustrated in a position such as the position of FIG. 25 with the interlocking pin 82 now disposed above the top wall 51 of the rocker member 50, The sequence of operation is as follows, The control member is first in a position such as illustrated in FIG, 24, The control member is then moved upwardly so that the pin 82 clears the wedge member, The control member may then be moved up further until the catch 66 clears totally through the slot 59, The control lever 70 is then rotated to the position of FIG, 25 with the pin 82 then directed forwardly as illustrated in FIG, 27, The control lever 70 may then be left in that position, It is noted that this action now interlocks the previously slidable handlebar assembly to the rocker member 50.

Figure 27:
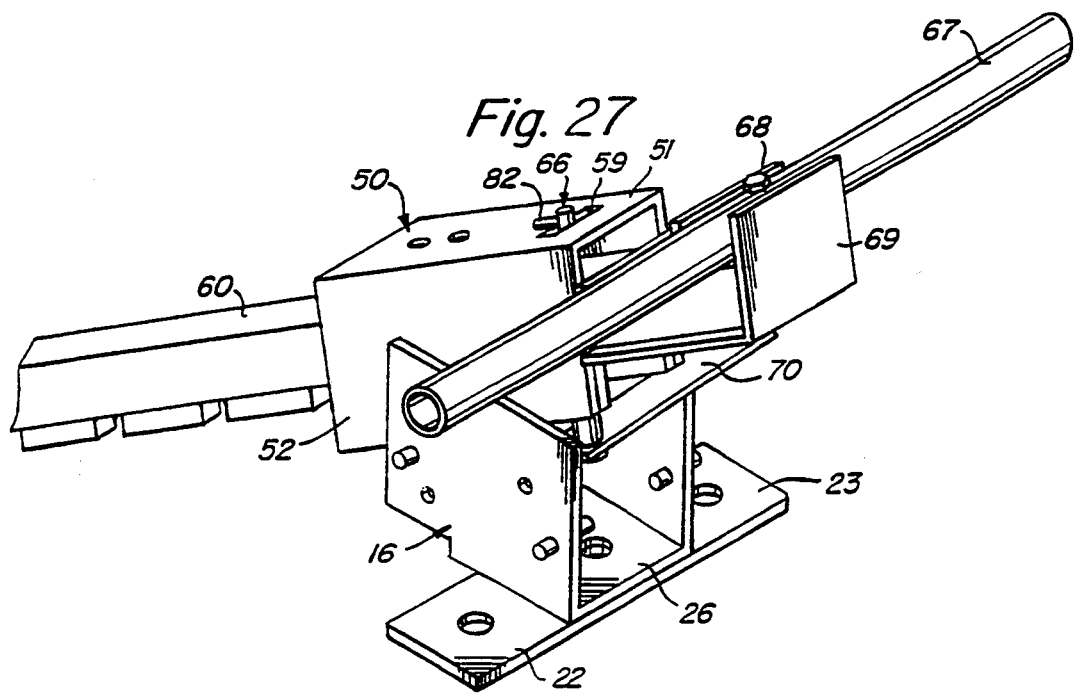
FIG. 27 is a perspective view illustrating the position of the control lever and associated catch when the adjustable handlebar is in its interlocked position with the rocker member.
Figure 28A:
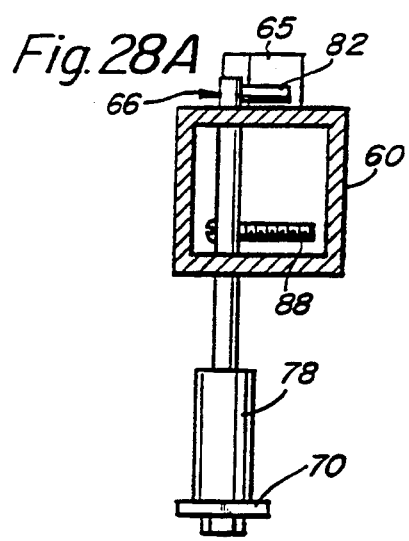
FIG. 28 illustrates further details of the control lever and associated catch.
Figure 28B:
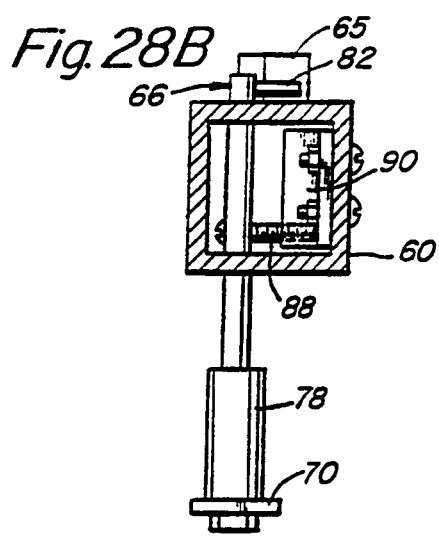
Figure 28C:
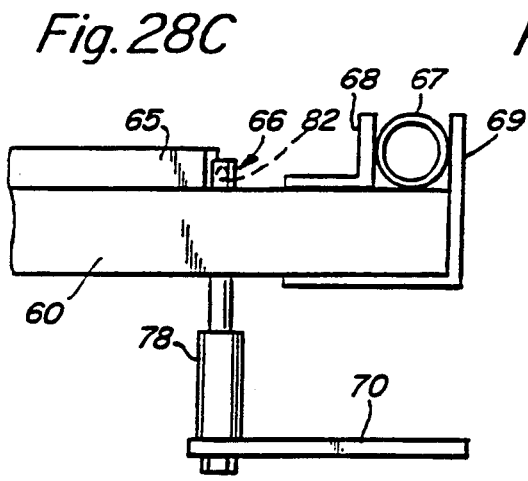
Figure 28D:
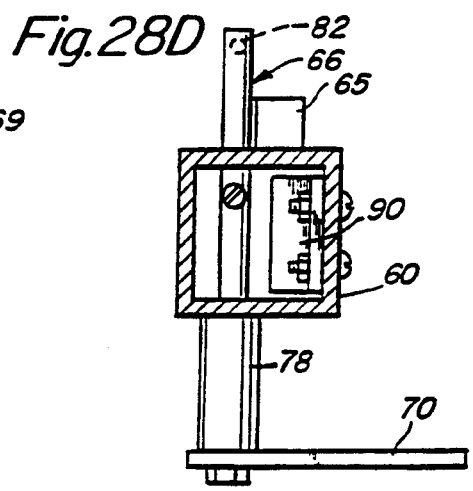
Figure 28E:
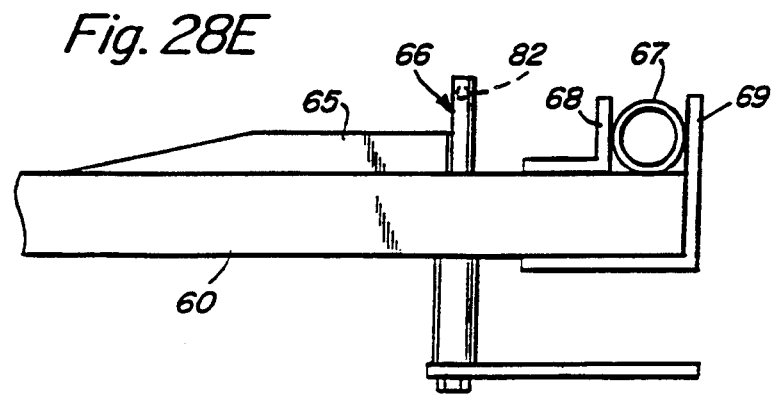

FIG. 27 also shows one of the limiting pins 85, It is noted that there are a series of hole in the side plate of the support member 16. This allows for positioning of the pins 85 at a number of different positions. This provides different angles for the rocker member 50. These pins may be in the form of allen screws.

FIG. 28 shows some further details of the interlocking catch and pin for interlocking the handlebar to the rocker member. In this regard it is noted that the catch 66 also supports a screw 88 disposed within the slide member 60 hollow tube. The screw 88 is used as a stop mechanism so that the catch cannot turn backwards which would cause it to not properly stop over the slot 59. With the stop arrangement the pin 82 is properly positioned and easily falls down to the original position. It is noted in FIG. 28 that the screw 88 interengages with the angle stop 90. It is noted that this stopping occurs with the pin 82 in a side-to-side position which corresponds to the slot 59. Also illustrated in FIG. 28-D is the catch 66 shown in an interlocked position such as the position of FIG. 27 in which the screw 88 is now of course out of engagement with the stop 90.

The stop arrangement is used primarily for the condition when one wishes to no longer interlock the handlebar with the rocker member. In this instance the control lever 70 is simply moved from the position of FIG. 27 to the position of FIG. 24. The stop arrangement provides for essentially an automatic alignment between the pin 82 and the slot 59 so that once the lever member 70 is rotated the interlocking pin falls directly through the slot 59 and the handlebar assembly is then free for sliding movement in the rocker member. Rear of wedge, used as guide, when pin is being raised, so pin cannot move forward, until past wedge and slot in rocker. Screw is only for rearward stopping.

Figure 30:
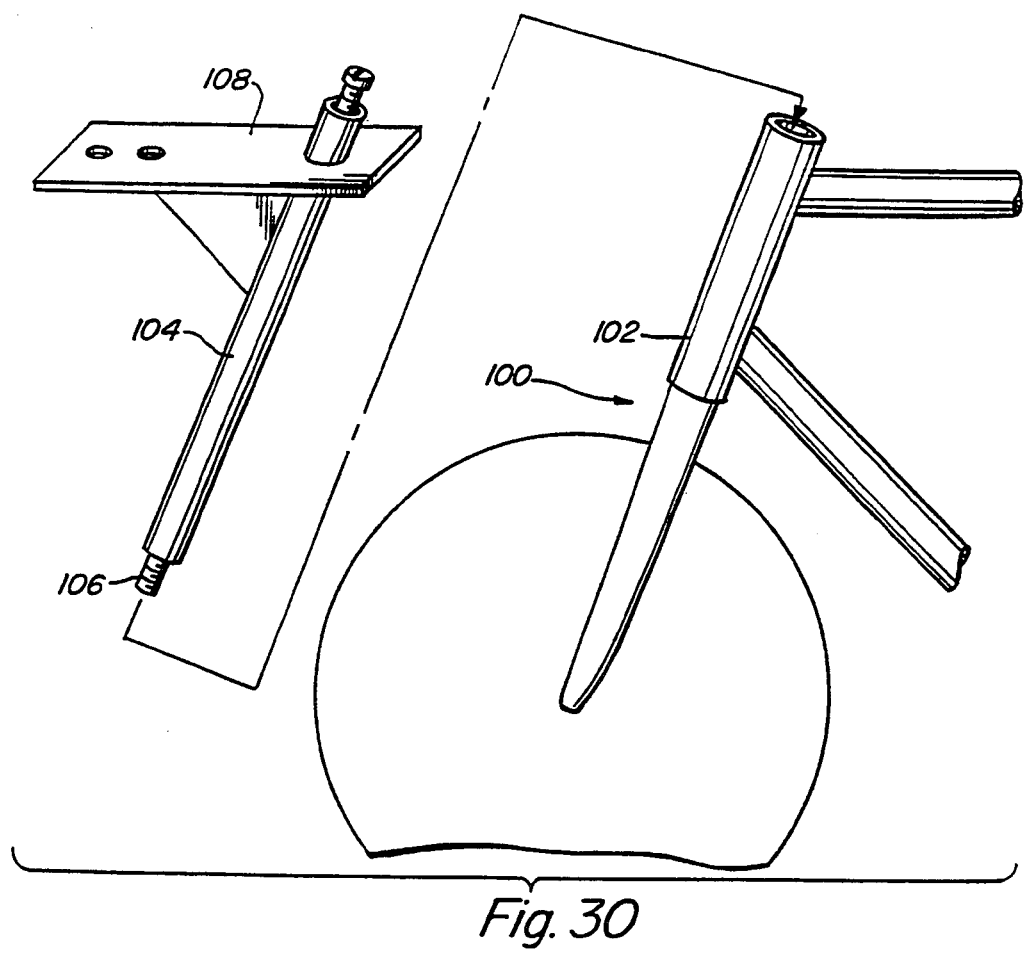
FIGS. 30 and 31 illustrate an alternate embodiment of the invention in which the bicycle handlebar is replaced by the apparatus disclosed in FIGS. 30 and 31.
Figure 31:
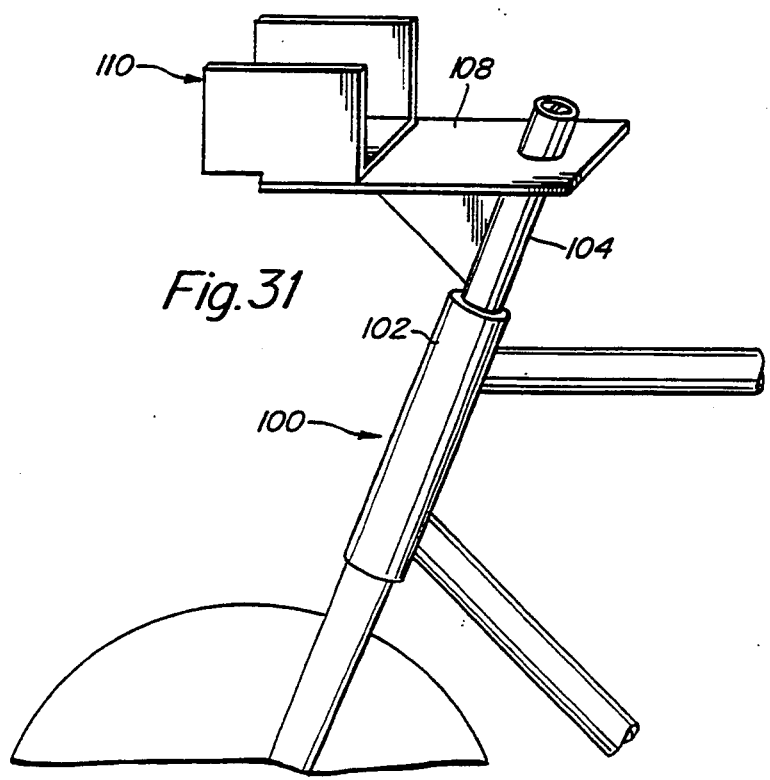

Reference is now made to FIGS. 30 and 31 illustrating the bicycle at 100. The bicycle has an existing member 102 that is the shaft for the normal handlebar for the bicycle. The handlebar is removed in the embodiment of FIGS. 30 and 31 and is replaced by the novel member illustrated in FIG. 30 including a support post 104. The support post 104 fits within the shaft receiving member 102. As noted in FIG. 30 there is also a bolt 106 that may support a member at the bottom thereof that binds the support post 104 within the tubular member 102. The support post 104 in turn supports a plate 108 that retains the base member 110. The base member 110 supports the rest of the mechanism in the same manner as the base member 16 previously described. The apparatus described in FIGS. 30 and 31 is not clamped but is directly inserted into the handlebar hole being part of the bicycle and eliminating the other handlebar.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. An adjustable handlebar apparatus for support on and to be used with a bicycle frame, said apparatus comprising;
    a base member,
    clamp means for securing the base member to the bicycle frame,
    a rocker member disposed on said base member,
    means for pivotally supporting the rocker member from the base member,
    a handlebar assembly including a handlebar,
    a slide member having front and rear end sections and means for securing the handlebar to the rear end section of the slide member, and means interlocking the slide member in different longitudinally-disposed positions in said rocker member.

2. An adjustable handlebar apparatus as set forth in claim 1 including a wedge member on top of the handlebar assembly slide member and disposed adjacent the handlebar, said wedge member adapted to provide an upward lift of the slide member upon engagement of the wedge member with the rocker member.

3. An adjustable handlebar apparatus as set forth in claim 1 wherein said rocker member further allows the handlebar to pivot to a desired up or down position while the bicycle is in motion.

4. An adjustable handlebar apparatus for support on and to be used with a bicycle frame, said apparatus comprising,
    a base member,
    a rocker member disposed on said base member, means for pivotally supporting the rocker member from the base member, a handlebar assembly including a handlebar, a slide member and means securing the handlebar to the slide member, and means for engaging the slide member in different positions in said rocker member, said handlebar assembly permitting interlocking of the handlebar in different forward to back positions, said forward to back positions allowing said handlebar slide member to be adapted to a desired position by sliding said slide member to said desired position through said rocker member.

5. An adjustable handlebar apparatus as set forth in claim 4, said apparatus also including adjustable means for engaging said slide member in different positions in said rocker member while bicycle is in motion.

6. An adjustable handlebar apparatus as set forth in claim 4 wherein said rocker member further allows the handlebar to pivot to a desired up or down position while the bicycle is in motion.

7. An adjustable handlebar apparatus and a bicycle frame, said apparatus supported on said bicycle frame, said apparatus comprising, a base member, a rocker member disposed on said base member, means for pivotally supporting the rocker member from the base member, a handlebar assembly including a handlebar, a slide member and means securing the handlebar to the slide member, and means for engaging the slide member in different positions in said rocker member, said handlebar assembly permitting interlocking of the handlebar in different forward to back positions, said forward to back positions allowing said handlebar slide member to be adapted to a desired position by sliding said slide member to said desired position through said rocker member.

8. An adjustable handlebar apparatus as set forth in claim 7 wherein said rocker member further allows the handlebar to pivot to a desired up or down position while the bicycle is in motion.

* * * * *